March 31, 1936. W. P. STANTON 2,035,845
METHOD OF MAKING LIGHT WEIGHT AGGREGATE
Original Filed Oct. 24, 1932    2 Sheets-Sheet 2

INVENTOR.
Wolcott P. Stanton
BY Lyon & Lyon ATTORNEYS

Patented Mar. 31, 1936

2,035,845

UNITED STATES PATENT OFFICE 2,035,845

METHOD OF MAKING LIGHT WEIGHT AGGREGATE

Wolcott P. Stanton, Visalia, Calif., assignor to National Gravelite Corporation, San Francisco, Calif., a corporation of California Continuation of applications Serial No. 569,269, October 16, 1931, and Serial No. 639,375, October 24, 1932. This application October 8, 1935, Serial No. 44,061

23 Claims. (Cl. 25—156)

This invention relates to methods whereby light weight strong aggregate may be readily and economically manufactured from argillaceous materials. The invention particularly relates to methods of controlling the burning or heating of the argillaceous material whereby the particles are rendered strong, vesicular and light in weight, while maintaining their character as discrete individual particles.

It has been known for a great many years that argillaceous materials such as clays and shales of the character commonly used in the ceramic industry, and particularly when containing appreciable quantities of carbon, sulfur and iron, when heated would expand or vesiculate. An attempt has been made to manufacture a light weight aggregate by forming masses of clinker from clay or other argillaceous material, which clinker, upon cooling, had to be crushed and graded in order to produce particles of the desired size. In such prior process, large quantities of waste material or fines were produced and it was impossible to regulate the crushing so as to produce only particles of a desired size. As a result, large quantities of vesiculated clay of a particle size not suited, or incapable of being sold or used, would accumulate. Moreover, the crushed particles were provided with pitted rough surfaces which impaired the workability of concrete in which such aggregate was used and the weight reduction possibilities of such concrete are relatively limited in relation to the strength obtainable.

The present invention relates to a process whereby the entire output of a quarry may be converted into a vesiculated clay aggregate of desired size ranges without the production of by-products of an undesired size. The aggregate of this invention is controllable within wide limits as to weight and strength. Moreover, the light weight aggregate of this invention, although of irregular shape, is provided with rounded contours and is uncrushed. The aggregate of this invention is of very light weight, improves (instead of impairs) the workability of concrete mixes, and results in concretes or other cementitious compositions of high strength.

The present invention also relates to methods of controlling the burning operation so that the particles being vesiculated are maintained as individual particles. The mechanism underlying the production of vesiculated clay aggregate or the vesiculation of argillaceous materials has not been understood heretofore. The present invention definitely teaches the conditions whereby the hereinabove described aggregate may be obtained in a ready and economical manner without the necessity of protracted preliminary experimental work.

Generally stated, I have discovered that when particles of argillaceous material, such as a clay or shale, either in their natural compacted condition or in the form of molded objects, are subjected to a temperature and for a time sufficient to produce incipient fusion in the particles vesiculation will take place. During this heating step a low temperature gradient should be maintained between the temperature of the heating gases and the external surface temperature of the particles, particularly during that period of time when the surface temperatures of the particles are of the order of temperatures of incipient fusion. The temperature of the flame or flame gases should be lower than that theoretically attainable and ordinarily existing. The rate at which the material is fed into the heating zone should also be regulated so that the particles are heated to a point of incipient fusion within a short period of time and shortly prior to discharge from such heating zone the particles should exhibit a tendency to cohere temporarily. The rate of feed, the temperatures employed and the time in the heating zone should not be sufficient, however, to sinter the particles together.

An object of this invention, therefore, is to disclose and provide methods whereby argillaceous materials may be converted into a light weight, strong and uncrushed vesicular aggregate for use in concrete or other cementitious bodies or as a filler, carrier, or the like.

A further object is to disclose and provide conditions of time, temperatures, rates of heat exchange, and the like whereby a light weight, uncrushed aggregate may be economically produced from argillaceous materials.

Other objects, advantages, adaptations and uses of the invention will become apparent to those skilled in the art from the following detailed description of preferred conditions and methods of performing the process of the invention.

For purposes of example and in order to facilitate understanding, reference will be had to the appended drawings, in which:

Fig. 1 diagrammatically illustrates all of the steps and units which may be used in a plant devoted to the manufacture of the aggregate.

Figure 1:
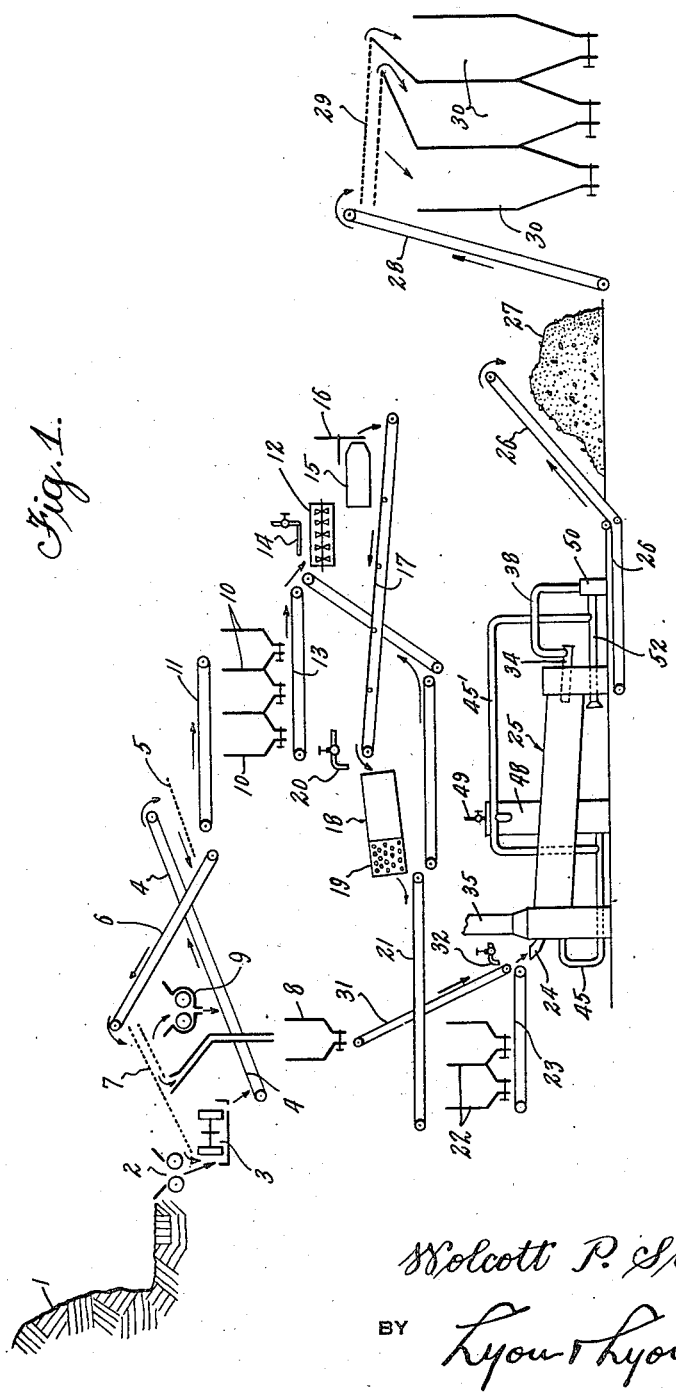

Before discussing the process in detail, attention is called to some of the important steps. It is necessary in all modifications of the process to form argillaceous particles conforming in range of size to the range of size desired in the finished product, suitable allowance being made in advance for the intended degree of expansion. These particles may be in natural form (such as are obtained by crushing or grinding argillaceous material and screening the same) or they may be in the form of molded pellets or agglomerates produced as hereinafter described in greater detail.

Various clays, shales and other argillaceous materials may be used. Pure clays, such as refractory or fire clays, china clay, ball clay, etc., are ordinarily not suitable. Common clays and shales of the type used in making brick and similar articles, especially when they contain appreciable amounts of iron, sulfur and/or carbon, are suitable. Carbonaceous clays and shales such as those found along the Hudson River in New York, near Seattle and Portland, Washington, in the Santa Monica Bay District near Los Angeles, or near San Francisco, California, are particularly suitable because of the light weight of the resulting aggregate. Any clay or shale which, when reduced to aggregate size and then rapidly heated to a temperature of incipient fushion, will vesiculate or expand, is adapted to this process. Clays which will not vesiculate but which have a melting or fusing point below about 2300° F. to 2400° F. can be caused to vesiculate by manipulating them in accordance with this invention. Clays having a broad maturing range are usually more suitable than those having a sharp and critical melting point.

In carrying out my process, it has been found that the addition of an oxidation prevention agent to the clay, either as an admixture with the clay during the forming of the particles, or as a surface coating after the particles are formed, is often highly advantageous and in some cases is essential. This agent may be a liquid such as petroleum, or may be solid carbonaceous matter provided it is very finely subdivided, such as powdered coal (80 mesh or finer), or sawdust. The liquid form is preferable.

When clays or shales are used which do not satisfactorily vesiculate, it has been found that the addition of mineral oil (such as fuel oil) to the clay, either during the formation of the particles or to the surface of the formed particles, is highly advantageous.

The heating zone in which the vesiculation takes place may assume different forms. The material may be heated by the action of flame gases either directly or indirectly. A rotary kiln of the kind used in burning cement is well suited. The heat source is preferably an oil flame atomized with air, steam, flue gases, or the like, and introduced just inside the lower or discharge end of the kiln. When an oil flame is used, it should be fairly long, easily and accurately controlled, and give rise to uniform heating.

When a rotary kiln is employed, the argillaceous particles of previously established size range are introduced into the upper end of the kiln in a continuous stream, from whence the material flows countercurrent to the flame gases to the point of discharge at the lower end of the kiln. The action of the hot gases upon the material, commencing with the entry of the material into the kiln and ending with its discharge from the kiln, divides itself into four well defined stages, which I designate as (1) drying or watersmoking, (2) preheating, (3) expansion and vesiculation and (4) cooling. While it will be understood that these stages merge into each other insensibly, without fixed lines of demarcation, the division in time and distance is roughly on the order of 20% for the drying stage, 50% for the preheating stage, 20% for the expansion stage and 10% for the cooling stage—under usual conditions of commercial operation, although subject to variation according to the conditions of a particular run.

The objective of the burning operation as a whole, and the factor most essential to proper results and proper control of the finished product, is to cause the particles to soften and temporarily coalesce, or agglomerate, during the expansion and vesiculation stage. By proper manipulation of the various conditions, as will appear, the bed of material in this stage will be seen to form a more or less agglomerated mat which carries upward as a unit, by adherence to the wall of the kiln, but falls away from the wall at some point short of the uppermost point of rotation. Upon dropping away from the wall of the kiln the material will be seen to momentarily resume its original form of separate particles in separate relative motion, followed by repetition of the matting phenomenon just described. As the material gradually advances into the relatively cool zone just preceding its discharge from the kiln, the intensity of the agglomeration phenomenon will be seen to diminish and ultimately vanish, with the result that the product as it leaves the kiln is substantially wholly separated into its original component particles, each of which is now separately expanded and vesiculated. It has been found that the degree of expansion and vesiculation is a function of the intensity of agglomeration and upcarry in the kiln, and as the latter is readily observable at all times and can be readily controlled as to its intensity, the operator is enabled to exercise accurate and instant control over the properties of the finished product, such as no other process provides.

The attainment of the objective described in the foregoing, and the control of the intensity of agglomeration, requires for any given raw material suitable regulation of (1) rate of feed, (2) time of burning, (3) maximum temperature, (4) flame temperature. It also requires (5) means for preventing or inhibiting oxidation of the surface of the particles during exposure to the kiln atmosphere—especially during the preheating stage—as by the use of oil or other means hereinafter referred to.

I have discovered that one of the most vital factors in the successful operation of the process is that of providing for a relatively low temperature differential between the flame, or other source of heat, and the surface of the particles in the third stage, or zone of maximum heat, during expansion and vesiculation. My process requires that the temperature of the flame or flame gases be considerably lower than would result from the theoretically correct proportion of air to fuel for complete combustion, and considerably lower than is the rule in conventional heating processes of this character. To accomplish this, I cool the flame by any one of various means, the preferred means consisting of the use of a relatively high proportion of excess air (40%–60% excess), which is preferably introduced at the burner tip and not, as the usual case, upwardly through the clinker drop. Attention has previously been called to the use of protective admixtures or coatings in the preparation of the raw feed, which are proportioned as needed to counteract the otherwise oxidizing effect of kiln gases containing a high proportion of excess air.

Another means for cooling the flame and flame gases, and one which also incorporates means for preventing oxidation of the material, consists of the use of a relatively high proportion of stack gases or other relatively cool and substantially neutral incombustible gases, preferably introduced in the same manner as the excess air. A still further means consists in maintaining a relatively low draft in the kiln by suitable adjustment of the stack damper as hereafter referred to.

Having established the proper conditions with respect to quantity of heat input to the kiln, combined with suitable means for control of the flame temperature, the rate of feed of material and its time of residence in the kiln is regulated, to the end that the material is thoroughly heated, as evidenced by incandescent appearance prior to entering the zone of maximum temperature, and without appreciable oxidation of the surfaces of the individual particles up to this point. If such oxidation occurs, I increase the amount of protective admixture or coating, or make an appropriate change in the flame cooling medium. By proper regulation, the operator is enabled to develop and maintain any desired degree of temporary agglomeration or cohesion and carry-up in the expansion zone, this temporary cohesion of the particles indicating the weight and strength changes taking place in the argillaceous particles.

An example showing the adaptation of the general teachings hereinabove expressed is illustrated in the appended drawings. As shown in Fig. 1, clay or shale taken from a quarry 1 is passed through a primary crusher 2 and then into a secondary grinder 3. The ground material discharged by the grinder 3 may be elevated as by conveyor 4 to a screen 5 wherein fine material is separated from the large particles. The oversize from screen 5 is fed by conveyor 6 to a double screen 7. The very coarse material (incapable of passing the screen 7) may be returned to the grinder 3. Particles of an intermediate range of sizes are discharged by the screen 7 into a storage bin 8. Smaller particles passing the double screen 7 may be discharged into a regrinder 9 and again returned to the double screen 7 as by the conveyor 6.

The fine particles passing the screen 5 may be fed to storage bins 10 by conveyor 11. This finely ground material may then be discharged into a pug mill 12 by a conveyor 13. Water in an amount sufficient to plasticize the clay in the pug mill 12 may be supplied by a spray head 14.

The pugged and plastic body of material is then fed into an auger 15 and expressed through a die head in the form of cylinders or ribbons which are cut off to the desired length by a cutting mechanism indicated at 16. The pellets so formed and of a substantially uniform size may then be fed as by conveyor 17 into a trommel 18 provided with a screen end section 19. If desired, fuel or other mineral oil may be applied to the surface of the pellets by a spray or drip device 20. Any small particles pass through the screen section 19 and may be returned to the pug mill 12. The pellets or argillaceous particles of a relatively narrow range in size may then be conveyed by suitable means, such as the conveyor 21, to storage bins 22 from whence they are removed by the conveyor 23 into the feed chute 24 of the kiln 25. It is to be understood that if desired the pellets may be fed directly from the screen 19 into the feed chute 24.

In the kiln 25, which is of the rotating cylindrical type, the argillaceous particles are subjected to the action of heat, such as counterflow flame gases. Vesiculation takes place within the kiln. The pellets are discharged from the lower end of the kiln and deposited in cooling piles 27 by means of a suitable conveyor and elevator 26.

In view of the fact that some of the pellets may not vesiculate to the same extent as others, the cooled pellets from the piles 27 may then be conveyed by elevator 28 to a screening device 29 from whence they are discharged into appropriate bins 30, the vesiculated particles in each bin being of a very narrow range of sizes. Desired quantities of the finished aggregate may then be withdrawn from the bins 30 as needed.

The above arrangement of apparatus is particularly suited for the manufacture of the molded pellets. These pellets may vary in size quite appreciably. They may be extruded through apertures ranging from about 3/8 inch in diameter to about 1 inch in diameter. These pellets may be cut or broken into various lengths ranging from about 1/2 inch to 1 inch. It is to be understood that only pellets of a substantially uniform size are made at any one time.

From the description given, it is to be observed that crushed unmolded particles were screened out and accumulated in the bin 8. By judicious arrangement of screens and by minor changes in the conveying system, a relatively large proportion of crushed unmolded particles of a desired size may be obtained. This quarry material (such as accumulates in bin 8) may be conveyed directly to the kiln 25 as by means of a conveyor 31. Prior to the introduction of this quarry material to the kiln, a small quantity of oil may be applied to the surface of the particles as by the drip or spray means 32. This quarry material may be of a substantially uniform size and generally comprises particles passing a 3/4 inch or 1 inch screen and remaining on a 1/2 inch or 3/8 inch screen. The aggregate resulting from the vesiculation of this crushed quarry material is light, provided with rounded edges and corners and with a sufficiently irregular or indented surface to function with great success as an aggregate.

In the manufacture of such quarry aggregate, it is obvious that the pug mill 12, auger 15 and trommel 18 are not employed.

In the event the screen 5 is of relatively fine mesh, say 1/8 inch or finer, the ground clay discharged into the bins 10 may be converted into a vesiculated sand-like aggregate. In the production of this sand-like aggregate the finely ground clay is discharged into the pug mill 12 or other suitable mixing or mulling device and there moistened with from about 1% to 2% of water, the amount of water being only sufficient to cause the clay to agglomerate into small particles, say particles smaller than about 1/4 inch in average dimension. If desired, from about 0.05% to 0.5% of mineral oil may be added to the material being pugged. The resulting agglomerates may then be directly discharged into a suitable storage bin 22 (the auger 15 and trommel 18 being eliminated) or the agglomerates may be screened and segregated as to sizes before storage or burning. This agglomerated material may be fed into the kiln 25 whenever it is desired to produce sand-like aggregate. It is to be understood that the discharge conveyor and elevator 26 deposit the various products produced into separate piles so that the storage bins contain piles of molded aggregate, quarry type aggregate and sand-like aggregate.

Figure 2:
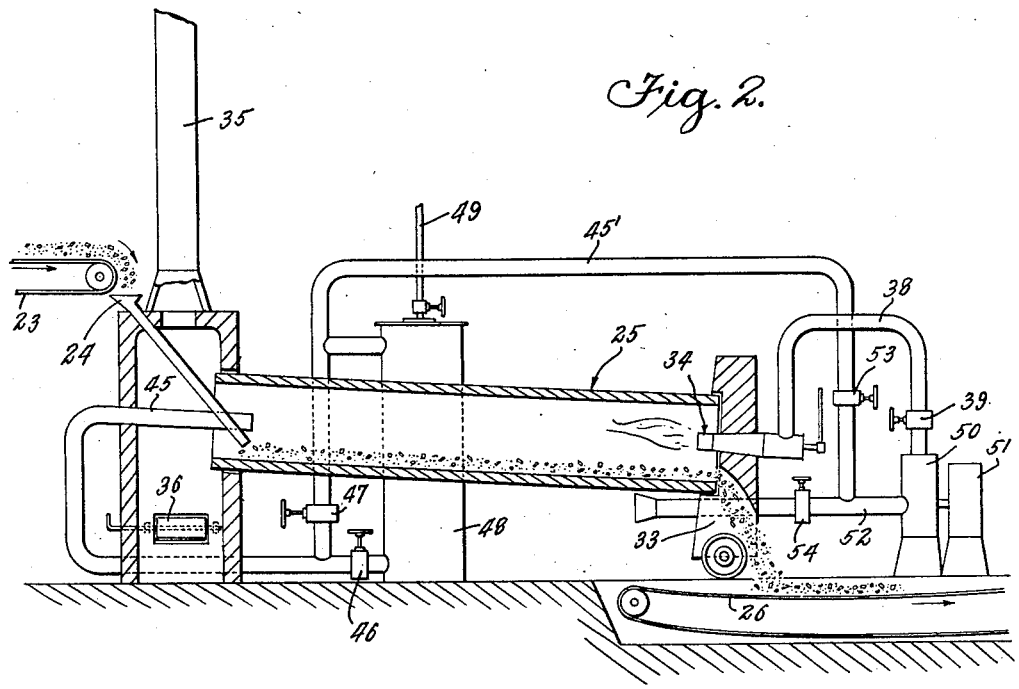
Fig. 2 is an enlarged representation of the kiln and auxiliary devices.
Figure 3:
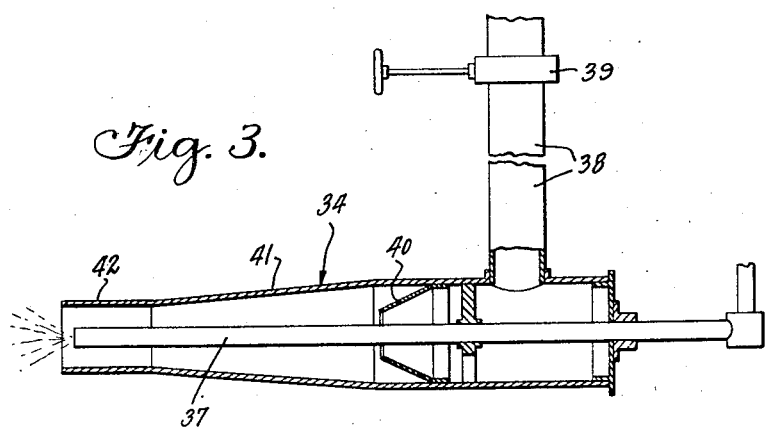
Fig. 3 is an enlarged representation of one type of burner found to be particularly effective in attaining the desired conditions.

Fig. 2 illustrates in greater detail the diagrammatic arrangement of the kiln 25. Means for rotating the kiln 25 are not shown. The raw material is fed into the chute 24 by means of the conveyor 23 and the burned vesiculated aggregate is discharged through the discharge opening 33 onto the discharge conveyor 26. The fire end of the kiln is provided with a burner 34, the combustion gases discharging through the stack 35. Draft may be controlled by a suitable damper diagrammatically shown at 36. A form of burner which has been found eminently successful is illustrated in Fig. 3. Fuel oil is supplied to the burner through the atomizing tube 37 whereas air is supplied through a conduit 38 having a valve 39 therein. The body of the burner 34 sometimes contains a conical orifice member 40 surrounding the atomizing tube, the forward end of the burner including a conical or tapered member 41 and a fire resisting end member 42.

An actual installation which has been found eminently successful included a kiln 80 feet long having an inside diameter of 6 feet in the fire end and 5 feet 4 inches in the upper end. This kiln was rotated at a speed of about one revolution a minute and with a slope of 1 inch per foot the material passed therethrough in about 45 minutes.

The atomizing tube, 2 inches in diameter, was supplied with fuel oil at 200° F. and about 150 pounds pressure. Air was supplied through a 12 inch air line 38 at a pressure of about 10.5 to 12 inches of water and a temperature ranging from 50° F. to 120° F. The opening in the orifice member 40 was 6 inches in diameter, the end pipe 42 being 8 inches in diameter. The end of the atomizing pipe 37 is ordinarily carried at or close to the end of the pipe 42 but the length of the flame can be regulated to some extent by varying the position of the end of the atomizing tube with reference to the end of the member 42.

The importance of maintaining a low temperature differential in the vesiculating zone of the kiln and a relatively low flame temperature, has been stressed hereinbefore. In conventional rotary kiln practice it is customary to employ as air for combustion with the fuel, only that amount theoretically required or at most an excess of 10%. Flame temperatures of the order of 3800°–4000° result. Moreover, it is customary to draw over 90% of this air up through the clinker drop or discharge opening 33 while less than 10% is introduced at the burner by mechanical means for atomization.

I have found, however, that in order to produce an unclinkered but vesiculated aggregate it is necessary to employ from 40% to 60% of excess air (or an equivalent amount of a mixture of air with relatively cool neutral incombustible gas) and that the greater part of this air or air with gas should be supplied by a blower under pressure directly to the burner.

By the use of this excess air in the manner stated, relatively low flame temperatures can be attained and in actual practice, while manufacturing vesiculated aggregate from clays and shales derived from Point Richmond, California, the temperature of the flame in the vesiculating zone has averaged about 2630° F. while the temperature of the temporarily cohering aggregate in such zone was found to average about 2050° F. A Morse disappearing filament type of pyrometer was used in these determinations.

Attention is called to the fact that the temperature differential between the temporarily cohering aggregate and the flame was less than 600° F. Satisfactory operation requires that this temperature differential be not lower than 400° F. and not in excess of 1200° F. as a maximum. In ordinary rotary kiln practice simiar temperature differentials are generally in excess of 1500° F.

In burning certain types of clays, and particularly when forming an aggregate from clay particles which have not been coated with oil, the formation of an appreciable or significant dense film of oxidized material should be avoided and guarded against. The formation of such oxidized film or coating can be successfully inhibited by using incombustible gases instead of or in mixture with air for cooling the flame. In order to obtain this result, an arrangement such as is shown in Fig. 2 may be used wherein a pipe 45 withdraws combustion gases from the upper end of the kiln or from the stack, these gases being admitted into the bottom of a cooling tower 48 supplied with cooling water sprays by line 49. The amount or proportion of gas passing through the cooling tower 48 may be controlled by means of the valves 46 and 47. The cooled gas is discharged from the top of the tower into line 45' which leads into the intake line 52 of a blower 50. This gas may be diluted with the requisite amount of air, the air being admitted through a valved outlet 54. Relative proportions of air and gas may be varied by suitably adjusting the valves 53 and 54. The mixture of air and cooled neutral incombustible gas is then discharged under the desired pressure from the blower 50 (driven by motor 51) through a valved line 38 into the burner.

Undue oxidation of the surface of the particles is also prevented and controlled by regulating the proportion of mineral oil added to the body of the pellets or applied to the surface thereof. The importance of guarding against the formation of a dense oxidized surface of appreciable thickness may be appreciated by contemplating the fact that particles with a heavily oxidized surface coating will have a higher apparent density and generally exhibit a higher water absorption than particles which have only an insignificant, minutely thin film of oxidized material. The preferred products of this invention may be either black, brown or reddish, but in no case do the particles carry a thick, oxidized, dense coating.

Although the present invention can be used in conjunction with other steps, such as the addition of refractory substances, to the surface of the particles, such additions increase the weight of the product and are not ordinarily desirable. Their use is unnecessary as the sintering together of the particles is effectively prevented by conducting the burning operation in accordance with the teachings herein expressed.

Although a specific arrangement of elements has been described hereinabove, it is to be understood that such arrangement is simply illustrative and numerous changes may be made not only in the arrangement of the various units but also in the type of apparatus used.

This application is a continuation of co-pending applications Serial No. 569,269, filed October 16, 1931, under the title "Light weight concrete aggregate", and Serial No. 639,375, filed October 24, 1932, under the title "Light weight aggregate for concrete."

All changes coming within the scope of the appended claims are embraced thereby.

I claim:

1. The method of manufacturing light weight aggregate for concrete which comprises: subdividing an argillaceous material; separating said subdivided material into portions having particles of different ranges of size; separately heating said portions to their respective temperatures of softening and vesiculation to impart to each said portion a desired degree of strength and vesicularity, and maintaining the constituent particles of each said portion individually distinct and in substantially constant relative movement throughout said heat treatment.

2. A method of manufacturing light weight aggregate for concrete which comprises: subdividing an argillaceous material; separating said subdivided material into portions, each having particles of a different range of size; and separately heating said portions to their respective temperatures of softening and vesiculation to impart to the particles of each of said portions a desired vesicularity, and maintaining the constituent particles of each of said portions individually distinct during said heat treatment whereby said particles are converted into a vesiculated aggregate.

3. A method of manufacturing light weight aggregate for concrete which comprises: subdividing an argillaceous material; separating said subdivided material into portions, each having particles of a different range of size; and separately heating each of said portions to a temperature and for a time sufficient to heat the said particles throughout to a temperature of incipient fusion and vesiculation by means of heated gases, and maintaining a relatively low temperature gradient between said gases and the external surface temperatures of the particles when such surface temperatures are of the order of temperatures of incipient fusion, whereby the constituent particles of each of said portions are maintained individually distinct and said particles are converted into vesiculated aggregate.

4. A method of manufacturing light weight aggregate for concrete which comprises: subdividing an argillaceous material; separating said subdivided material into portions, each having particles of a different range of size; separately heating each of said portions to a temperature and for a time sufficient to heat the said particles throughout to a temperature of incipient fusion and vesiculation by means of heated gases, and maintaining a relatively low temperature gradient between said gases and the external surface temperatures of the particles when such surface temperatures are of the order of temperatures of incipient fusion by the controlled introduction of relatively cold incombustible gas into the heated gases, whereby the constituent particles of each of said portions are maintained individually distinct and said particles are converted into vesiculated aggregate.

5. A method of manufacturing light weight aggregate for concrete which comprises: subdividing an argillaceous material; separating said subdivided material into portions, each having particles of a different range of size; separately heating each of said portions to a temperature and for a time sufficient to heat the said particles throughout to a temperature of incipient fusion and vesiculation by means of heated gases, and maintaining a relatively low temperature gradient between said gases and the external surface temperatures of the particles when such surface temperatures are of the order of temperatures of incipient fusion by surrounding said heated gases with an annulus of relatively cold incombustible gas, whereby the constituent particles of each of said portions are maintained individually distinct and said particles are converted into vesiculated aggregate.

6. The method of manufacturing light weight aggregate for concrete which comprises: finely grinding an argillaceous material; mixing said ground material with water sufficient to dampen but insufficient to plasticize said material; mechanically agitating said dampened material to produce individually coherent and mutually separate pellets of varied size; separating said pellets into groups of different size ranges; separately heating said groups to their respective temperatures of softening and vesiculation to impart to the pellets of each said group a desired degree of strength and vesicularity, and maintaining said pellets individually distinct and in substantially constant relative movement throughout said heat treatment.

7. The method of manufacturing light weight aggregate for concrete which comprises: subdividing an argillaceous material in water to form a plastic mass; extruding said mass through an orifice to form a substantially solid stream; crumbling said extruded mass to form individually coherent and mutually separate pellets of varied size; separating said pellets into groups of different size ranges; heating said groups to their respective temperatures of softening and vesiculation to impart to the pellets of each said group a desired degree of strength and vesicularity, and maintainng said pellets individually distinct and in substantially constant relative movement throughout said heat treatment.

8. The method of firing argillaceous particles to produce expansion and vesiculation thereof which comprises: feeding a stream of said particles in substantially constant relative movement through a heating zone in counterflow contact with hot fire gases, and introducing into said zone a heating flame surrounded by an annulus of relatively cold air, the total air supply being in excess of the quantity required for complete combustion of the fuel.

9. In a method of firing argillaceous particles to produce expansion and vesiculation thereof, the steps of: feeding a stream of said particles in substantially constant relative movement through a heating zone in counterflow contact with hot fire gases; introducing a heating flame into said zone, and shrouding said flame in an annulus of relatively cold incombustible gas.

10. In a method of firing argillaceous particles to produce expansion and vesiculation thereof, the steps of: feeding a stream of said particles in substantially constant relative movement through a heating zone in counterflow contact with hot fire gases; introducing a heating flame into said zone and producing thereby expansion and vesiculation of said particles, and lowering the temperature of the flame materially below the maximum temperature of combustion by the introduction thereto of a supply of relatively cold incombustible gas.

11. In a method of manufacturing light weight aggregate from argillaceous particles, the steps of: feeding a stream of argillaceous particles in substantially constant relative movement through a heating zone in counterflow with hot fire gases derived from a heating flame, said particles being fed at a rate sufficient to heat the same to a temperature of incipient fusion and vesiculation, and maintaining a relatively low temperature gradient between said gases and the external surface temperature of the particles when said surface temperatures are of the order of temperatures of incipient fusion of the particles.

12. In a method of manufacturing light weight aggregate from argillaceous particles, the steps of: feeding a stream of argillaceous particles in substantially constant relative movement through a heating zone in counterflow with hot fire gases derived from a heating flame, said particles being fed at a rate sufficient to heat the same to a temperature of incipient fusion and vesiculation and to a condition of temporary cohesion, and maintaining a relatively low temperature gradient between said gases and the external surface temperature of the particles when said surface temperatures are of the order of temperatures of incipient fusion of the particles by shrouding said flame in an annulus of relatively cold incombustible gas, whereby said particles are discharged from the heating zone in discrete, vesiculated form.

13. A method of manufacturing light weight concrete aggregate which comprises: forming argillaceous particles of a relatively narrow range in size, vesiculating said particles by continuously advancing the particles through a heating zone countercurrent to flow of flame gases, at a rate sufficient to heat said particles to a temperature of incipient fusion and to produce a temporary cohesion between said particles in said zone but not to permanently sinter the particles together, and lowering the temperature of the flame gases in that portion of the heating zone where temporary cohesion takes place by introducing a relatively cold incombustible gas into said zone.

14. A method of manufacturing light weight concrete aggregate which comprises: forming argillaceous particles of a relatively narrow range in size, vesiculating said particles by continuously advancing the particles through a heating zone countercurrent to flow of flame gases at a rate sufficient to heat said particles to a temperature of incipient fusion and to produce a temporary cohesion between said particles in said zone but not to permanently sinter the particles together, and lowering the temperature of the flame gases in that portion of the heating zone where temporary cohesion takes place by shrouding the flame with an annulus of relatively cold incombustible gas.

15. A method of manufacturing light weight concrete aggregate which comprises: forming argillaceous particles of a relatively narrow range in size, vesiculating said particles by continuously advancing the particles through a heating zone countercurrent to flow of flame gases at a rate sufficient to heat said particles to a temperature of incipient fusion and to produce a temporary cohesion between said particles in said zone but not to permanently sinter the particles together, and lowering the temperature of the flame gases in that portion of the heating zone where temporary cohesion takes place by introducing relatively cold air to said flame in quantity materially in excess of that required for combustion.

16. A method of manufacturing light weight concrete aggregate which comprises: forming argillaceous particles of a relatively narrow range in size, applying a small quantity of petroleum oil to the surface of said particles, vesiculating said particles by continuously advancing the particles through a heating zone countercurrent to flow of flame gases at a rate sufficient to heat said particles to a temperature of incipient fusion and to produce a temporary cohesion between said particles in said zone but not to permanently sinter the particles together, and lowering the temperature of the flame gases in that portion of the heating zone where temporary cohesion takes place by introducing a relatively cold incombustible gas into said zone.

17. A method of manufacturing light weight concrete aggregate which comprises: forming argillaceous particles of a relatively narrow range in size, applying a small quantity of petroleum oil to the surface of said particles, vesiculating said particles by continuously advancing the particles through a heating zone countercurrent to flow of flame gases at a rate sufficient to heat said particles to a temperature of incipient fusion and to produce a temporary cohesion between said particles in said zone but not to permanently sinter the particles together, and lowering the temperature of the flame gases in that portion of the heating zone where temporary cohesion takes place by shrouding the flame with an annulus of relatively cold incombustible gas.

18. A method of manufacturing light weight concrete aggregate which comprises: forming argillaceous particles of a relatively narrow range in size by a process including forming a plastic body of argillaceous material and water, extruding said body and subdividing the extruded body; vesiculating said particles by continuously advancing the particles through a heating zone countercurrent to flow of flame gases at a rate sufficient to heat said particles to a temperature of incipient fusion and to produce a temporary cohesion between said particles in said zone but not to permanently sinter the particles together, and lowering the temperature of the flame gases in that portion of the heating zone where temporary cohesion takes place by introducing a relatively cold incombustible gas into said zone.

19. A method of manufacturing light weight concrete aggregate which comprises: forming argillaceous particles of a relatively narrow range in size by a process including forming a plastic body of argillaceous material and water, extruding said body and subdividing the extruded body, said body containing added mineral oil; vesiculating said particles by continuously advancing the particles through a heating zone countercurrent to flow of flame gases at a rate sufficient to heat said particles to a temperature of incipient fusion and to produce a temporary cohesion between said particles in said zone but not to permanently sinter the particles together; and lowering the temperature of the flame gases in that portion of the heating zone where temporary cohesion takes place by shrouding the flame with a relatively cold incombustible gas.

20. In a method of manufacturing light weight vesiculated aggregate from argillaceous material, the steps of: forming argillaceous particles of relatively narrow range in size; vesiculating said particles by continuously advancing the same through a heating zone counterflow to flame gases at a rate sufficient to heat said particles to a temperature of incipient fusion in a period of time of between 20 and 80 minutes while regulating the temperature of the gases within said heating zone to produce a temporary cohesion between said particles in said zone but not to permanently sinter the particles together; maintaining a low temperature gradient of between about 200° F. and 1200° F. between the temperature of the flame and the external surface temperature of the particles when such surface temperature is of the order of temperature of incipient fusion, and then cooling the particles whereby the particles are converted into a vesiculated uncrushed aggregate.

21. In a method of manufacturing light weight vesiculated aggregate from argillaceous material, the steps of: forming argillaceous particles of relatively narrow range in size; vesiculating the said particles by continuously advancing the same through a heating zone counterflow to flame gases at a rate sufficient to heat said particles to a temperature of incipient fusion in a period of time of between 20 and 80 minutes while regulating the temperature of the gases within said heating zone to produce a temporary cohesion between said particles in said zone but not to permanently sinter the particles together; maintaining a low temperature gradient of between about 200° F. and 1200° F. between the temperature of the flame and the external surface temperature of the particles when such surface temperature is of the order of temperature of incipient fusion, said low temperature gradient being maintained by shrouding the flame with an annulus of relatively cold incombustible gas; and then cooling the particles whereby the particles are converted into a vesiculated uncrushed aggregate.

22. In a method of manufacturing light weight concrete aggregate from argillaceous material, the steps of: forming argillaceous particles of a relatively narrow range in size; vesiculating said particles by continuously advancing the particles through a heating zone countercurrent to flow of flame gases at a rate sufficient to heat said particles to a temperature of incipient fusion and to produce a temporary cohesion between said particles in said zone but not to permanently sinter said particles together; and preventing the formation of a significant dense coating on the surface of the particles, by the addition of regulated quantities of heavy mineral oil to said particles prior to introduction of said particles into said heating zone, and by lowering the temperature of the flame gases in that portion of the heating zone where temporary cohesion takes place by introducing relatively cold incombustible gas into said zone.

23. In a method of manufacturing light weight vesiculated aggregate from argillaceous material, the steps of: converting crude argillaceous material from a quarry into portions, each having particles of a different range in size, one of said portions comprising crushed unmolded particles and another comprising molded particles; separately vesiculating the particles of each portion by continuously advancing the same through a heating zone counterflow of flame gases at a rate sufficient to heat said particles to a temperature of incipient fusion in a period of time of between 20 and 80 minutes while regulating the temperature of the gases within said heating zone to produce a temporary cohesion between said particles in said zone but not to permanently sinter the particles together; maintaining a low temperature gradient of between about 500° F. and 1200° F. between the temperature of the flame and the external surface temperature of the particles when such surface temperature is of the order of temperature of incipient fusion, said low temperature gradient being maintained by shrouding the flame with an annulus of relatively cold incombustible gas; preventing the formation of a significant dense coating on the surface of the particles in the heating zone by the addition of regulated and controlled quantities of mineral oil to said particles prior to introduction of the particles into said zone; and then cooling the particles whereby the particles are converted into a vesiculated uncrushed aggregate.

WOLCOTT P. STANTON.